US006331069B1

(12) United States Patent
Putti

(10) Patent No.: US 6,331,069 B1
(45) Date of Patent: Dec. 18, 2001

(54) CONCRETE EXTRUSION MACHINE AND SPIRAL CONVEYOR THEREFOR

(76) Inventor: George Putti, 1586 Bay Road, North Vancouver, British Columbia (CA), V7J 1A1

( * ) Notice: Subject to any disclaimer, the term of this patent is extended or adjusted under 35 U.S.C. 154(b) by 0 days.

(21) Appl. No.: 09/007,152

(22) Filed: Jan. 14, 1998

(51) Int. Cl.$^{7}$ .............................. B29B 7/00; A21C 1/06; B28C 1/16; B01F 7/08

(52) U.S. Cl. .............................. 366/89; 366/323; 366/88

(58) Field of Search .............................. 366/89, 79, 88, 366/96, 97, 98, 99, 318, 323

(56) References Cited

U.S. PATENT DOCUMENTS

| | | | | |
|---|---|---|---|---|
| 291,849 | | 1/1884 | Howson . | |
| 938,223 | | 10/1909 | Dockery . | |
| 1,153,599 | | 9/1915 | Carr et al. . | |
| 2,123,243 | | 7/1938 | Janert . | |
| 2,818,790 | | 1/1958 | Canfield et al. . | |
| 2,946,089 | * | 7/1960 | Heston | 366/79 |
| 3,159,897 | | 12/1964 | Ellis et al. . | |
| 3,193,901 | | 7/1965 | Lee et al. . | |
| 3,795,386 | * | 3/1974 | Carter et al. | 366/89 |
| 3,877,860 | | 4/1975 | Putti | 425/380 |
| 4,022,556 | | 5/1977 | Goetjen . | |
| 4,046,848 | | 9/1977 | Putti | 264/70 |
| 4,058,298 | * | 11/1977 | Duska et al. | 366/79 |
| 4,330,242 | | 5/1982 | Putti | 425/64 |
| 4,346,652 | * | 8/1982 | de Ruyter | 366/89 |
| 4,527,899 | * | 7/1985 | Blach et al. | 366/79 |
| 4,838,700 | * | 6/1989 | Williamson | 366/89 |
| 5,217,303 | * | 6/1993 | Geyer | 366/89 |

FOREIGN PATENT DOCUMENTS

| | | | | |
|---|---|---|---|---|
| 208282 | | 3/1960 | (AT) . | |
| 720048 | | 10/1965 | (CA) . | |
| 910030 | | 9/1972 | (CA) . | |
| 1031934 | | 5/1978 | (CA) . | |
| 1105244 | | 7/1981 | (CA) . | |
| 1205985 | | 6/1986 | (CA) . | |
| 623264 | | 9/1935 | (DE) . | |
| 34 06 665 | * | 9/1985 | (DE) | 366/79 |
| 0339961 | | 2/1989 | (EP) . | |
| 994578 | | 6/1965 | (GB) . | |
| 1342601 | | 1/1974 | (GB) . | |
| 2020223 | | 11/1982 | (GB) . | |
| 2184976 | | 12/1985 | (GB) . | |
| 230734 | | 12/1984 | (JP) . | |
| 214117 | | 3/1989 | (NZ) . | |

* cited by examiner

*Primary Examiner*—Tony G. Soohoo
(74) *Attorney, Agent, or Firm*—Norman M. Cameron

(57) ABSTRACT

A spiral conveyor for a concrete extrusion machine has a first spiral conveyor section with a first external diameter. There is a second spiral conveyor section having a second external diameter which is greater than the first diameter. The second section is spaced apart from the second section. A third spiral conveyor section is between the first section and the second section. The first end of the third section is connected to the first section and the second end is adjacent to the second section. The second spiral conveyor section may be mounted on a hollow shaft of the third section. The second section has two longitudinally divided components, each having a recess therein. Connectors interconnect the two components and a locking device is between the hollow shaft and the second section.

14 Claims, 5 Drawing Sheets

CONCRETE EXTRUSION MACHINE AND SPIRAL CONVEYOR THEREFOR

BACKGROUND OF THE INVENTION

Traveling concrete extrusion machines are typically used for the making hollow core concrete slabs. These machines have a hopper which receives premixed concrete. The concrete falls into a feed chamber which is mounted on a frame. The machines also have a molding chamber where the concrete is molded into the profile of the slab. One or more spiral conveyors push the concrete from the feed chamber towards the molding chamber and, at the same time, propel the machine in the opposite direction. Each of the spiral conveyors is rotatable about a non-rotating mandrel shaft. A series of mandrels with internal vibrators are connected to the shaft. Similar machines are disclosed, for example, in my earlier U.S. Pat. No. 4,330,242.

The compression on the concrete in the molding chamber is increased where the spiral conveyors have tapered sections such that the flights of each conveyor are larger in diameter towards the molding chamber compared with flights closer to the feed chamber. This arrangement is shown, for example, in my British Patent No. 1,342,601. However, wear is accentuated at the end of the spiral conveyor adjacent to the mandrels. This leads to a rounding off of the conveyor flights in this location and a corresponding reduction in the compression effect otherwise achieved by such a tapered spiral conveyor.

Replacing the spiral conveyors is an expensive proposition since they are made of a special high chromium iron alloy. Moreover this involves dismantling the extrusion machine with attendant high labor costs and loss of production. Accordingly, attempts have been made to provide replaceable sections on the spiral conveyors where wear is most extreme. Such an arrangement is shown, for example, in Canadian patent 1,205,985 to Kiss. This patent shows a conveyor with a replaceable section made in two halves. These halves are connected to the main portion of the main auger by bolts.

However, these bolts are often shaken lose by vibrators in the mandrel. The lose bolts allow halves of the conveyor to disconnect and can cause damage to the machine. Alternatively, the vibrations of the mandrels can cause the bolts to become welded to the main auger. Thus the bolts break off when attempts are made to loosen them to replace the sections of the spiral conveyors.

It is an object of the invention to provide an improved spiral conveyor for a concrete extrusion machine which has a tapered profile, but significantly reduces the wear which is normally concentrated at the end of the conveyor adjacent the mandrels.

It is also an object of the invention to provide an improved spiral conveyor for a concrete extrusion machine which has a replaceable section in a high wear location, but is not adversely affected by vibrations in the mandrel or other parts of the machine since it is not connected to the main auger by bolts or the like.

It is hot still further object of the invention to provide an improved spiral conveyor with a replaceable section which can be easily removed and replaced with a new section without undue labor costs or loss of production of the machine.

SUMMARY OF THE INVENTION

According to one aspect of the invention, there is provided a spiral conveyor for a concrete extrusion machine which has a first spiral conveyor section having a first length and a first external diameter. A second spiral conveyor section is straight and has a second external diameter, which is greater than the first external diameter, and a second length. The first section is spaced apart from the second section. A third spiral conveyor section is between the first section and the second section. The third section is tapered, has a third length, a first end being adjacent to the first section and a second end being adjacent to the second section. The first section may be straight. The first end has the first external diameter and the second end has the second external diameter. There is means for mounting the spiral conveyor in the extrusion machine.

According to another aspect of the invention, there is provided a spiral conveyor for a concrete extrusion machine. The conveyor has a first spiral conveyor section and a shaft extending axially from the first section. A second spiral conveyor section is mounted on the shaft. The second section has two symmetrical halves. Each half has a semi-cylindrical recess therein. Connectors interconnect the two halves and a locking device is between the shaft and the second section. The two halves are not connected to the mandrel shaft.

According to a further aspect of the invention, there is provided a traveling extrusion machine for forming hollow core concrete sections. The machine has a frame and a feed chamber mounted on the frame for receiving premixed concrete. A molding chamber is adjacent to the feed chamber. There is a mandrel in the molding chamber and a vibrator mounted in the mandrel. A rotatable spiral conveyor extends from the feed chamber toward the molding chamber. The conveyor has a hallow shaft adjacent the mandrel and a section of the spiral conveyor is releasably mounted on the shaft. The section of the conveyor includes two halves on opposite sides of the shaft. A non-rotation locking device is between the halves and the shaft. Connectors interconnect the two halves, the connectors being free of the shaft.

According to a still further aspect of the invention, there is provided a traveling extrusion machine for forming hollow core concrete sections. The machine has a frame and a feed chamber mounted on the frame for receiving premixed concrete. A molding chamber is adjacent to the feed chamber. A non-rotatable mandrel shaft extends from the fee chamber to the molding chamber. A rotatable spiral conveyor is mounted on the mandrel shaft and extends from the feed chamber to the molding chamber. The conveyor has a first section within the feed chamber having flights with a first constant external diameter. A second section of the conveyor adjacent to the molding chamber has flights with a second constant external diameter. The second diameter is greater than the first diameter. The second section extends along a portion of the conveyor. A third section of the conveyor is between the first section and the second section and has flights which taper from the first diameter to the second diameter. Preferably the second section has a plurality of flights.

The invention offers significant advantages over the prior art. One aspect of the invention provides a spiral conveyor for a concrete extrusion machine which is easily replaceable and is not subject to loss of components due to vibrations. Moreover, the replaceable section does not tend to become welded to the mandrel shaft or the remaining portion of the conveyor since bolts can be used to interconnect the two halves of the replaceable section, but the bolts do not engage the mandrel shaft or other portion of the conveyor. Instead a non-rotation locking device, such as a key and a keyway, are used to prevent rotation of the replaceable section relative to the main portion of the conveyor. The bolts may become frozen due to vibrations, but they can be removed simply by burning off the heads of the bolts or nut with a torch. No portion of the bolts or the replaceable section remains attached to the other portion of the conveyor.

Unlike the prior art, spiral conveyors and concrete extrusion machines according to another aspect of the invention provide a spiral conveyor section adjacent the molding chamber which has a fixed, increased diameter over a set distance along the conveyor. This arrangement appreciably decreases wear at that point compared with tapered conveyors which terminate abruptly adjacent the molding chamber. The larger end of the tapered section is where wear typically occurs. The invention extends the larger diameter of the conveyor a certain distance adjacent the molding chamber. In other words , the conveyor has a larger diameter straight section following the tapered section. The larger diameter straight section distributes the compression force over a greater area, accordingly decreasing wear and increasing the compression effect on the slab being formed.

DETAILED DESCRIPTION OF THE PREFERRED EMBODIMENTS

Figure 4:
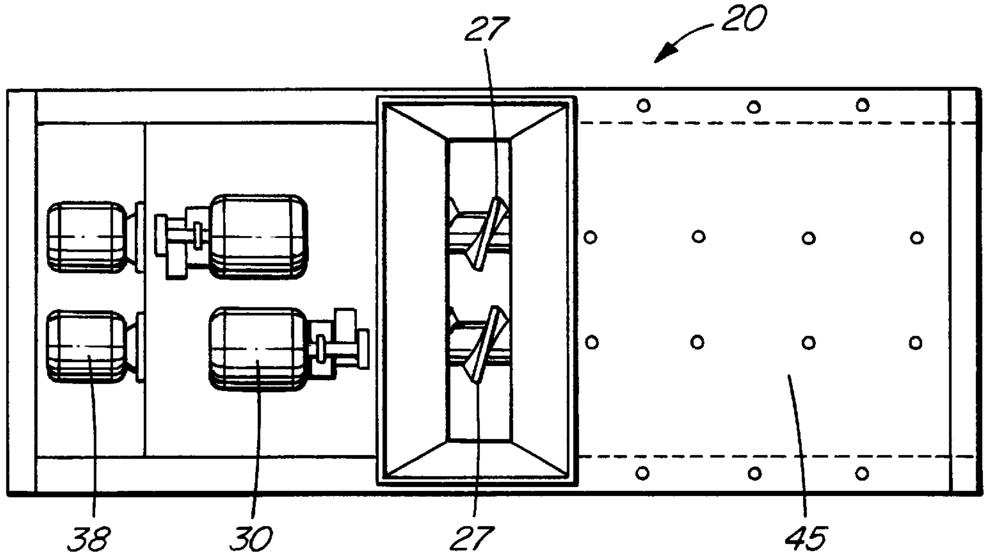
FIG. 4 is a top plan view of a traveling concrete extrusion machine according to an embodiment of the invention.
Figure 5:
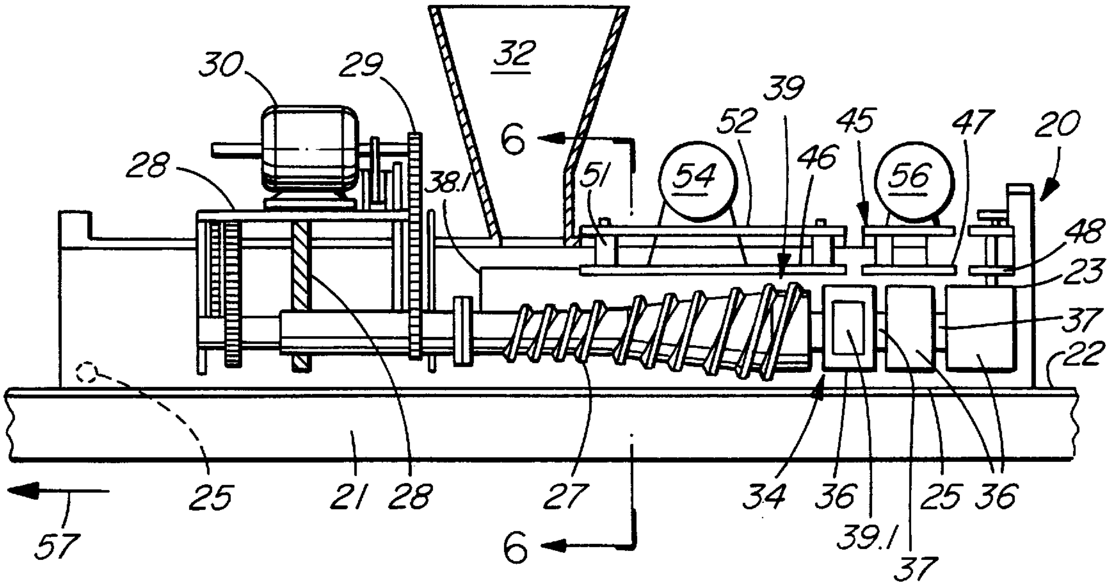
FIG. 5 is a side elevation, partly broken away, of the machine of FIG. 4.
Figure 6:
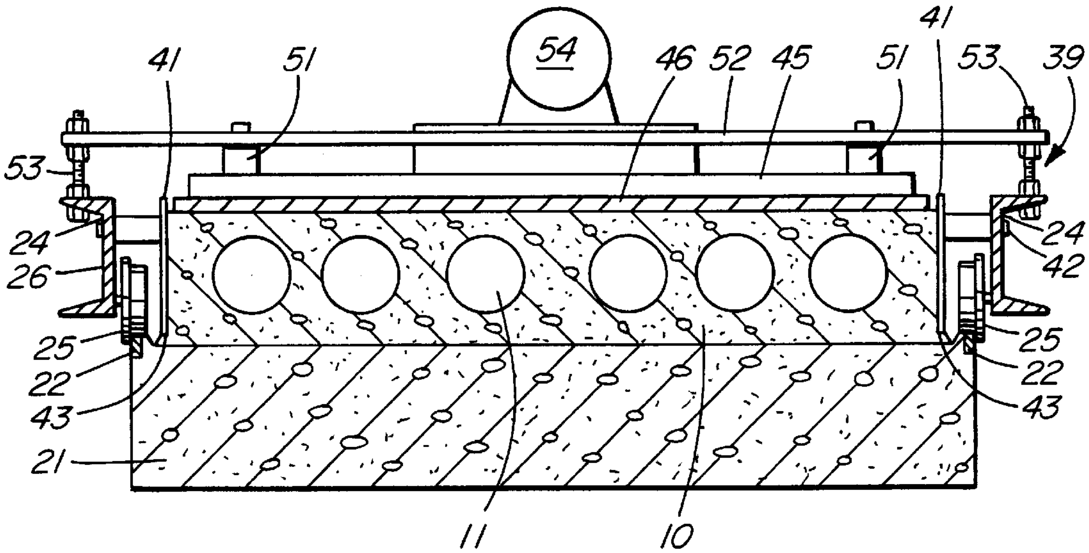
FIG. 6 is a sectional view taken the long line 6—6 of FIG. 5.

Referring to the drawings and first to FIGS. 4–6, these show a traveling concrete extrusion machine 20 of the type used to produce a hollow core concrete slab 10 as shown in FIG. 6. The machine travels over a stationary casting bed 21 in the direction indicated by arrow 57. The machine has a frame 24 provided with flanged wheels 25 which ride along parallel rails 22 of the casting bed.

The machine has one or more spiral conveyors 27 mounted for rotation in a supporting framework 28 which is supported by frame 24. Only one spiral conveyor is shown in FIG. 5, and two spiral conveyors are shown in FIG. 4. However six spiral conveyors are required to produce the slab 10 shown in FIG. 6 which has six hollow cores 11. The spiral conveyors are driven by a roller chain train 29 which is operatively coupled to electric motor 30 mounted on the framework 28. The spiral conveyors rotate about non-rotating mandrel shaft 35 shown in FIGS. 1 and 2.

There is a hopper 32 which receives premixed concrete. The concrete drops from the hopper into a feed chamber 38.1. Each spiral conveyor 27 extends from the feed chamber 38.1 to molding chamber 39.

The molding chamber is formed by a pair of vertical side plates 41 which are secured to the frame 24 by bolts 42. The side plates have lower edges 43 which are just clear of the casting bed and serve to restrict lateral displacement of the concrete from the molding chamber.

The molding chamber also has a top plate structure 45 consisting of a pair of vibratory plates 46 and 47 disposed in tandem and followed by a finishing plate 48. Plate 46 is rectangular in plan and is supported by bolts and vibratory dampening blocks 51 mounted on a cross frame structure 52. The cross frame structure is adjustably mounted on the frame 24 by bolts 53. Vibratory plate 46 extends over the spiral conveyor and mandrel and has a mechanical vibrator 54 mounted centrally thereon. Vibratory plate 47 has a similar vibrator 56 and is mounted on the machine in the same manner as vibratory plate 46. Finishing plate 48 is a smooth, transversely extending plate mounted in the same manner as the vibratory plates. Vibratory plate 46 is positioned a small distance above, approximately 1/8 inch above, the elevation of the desired finished surface of the slab 10. Vibratory plate 47 is set at the same elevation as the finished surface, as is finishing plate 48. Vibrators 54 and 56 are chosen and arranged so that the amplitude of vibration of plate 46 is far greater than the amplitude of vibration of plate 47.

Mandrel shaft 35 is connected to a series of mandrels 36, three in this example, which are connected in series at the aft end of the mandrel shaft. The mandrels are separated from each other and from the mandrel shaft by vibration dampening blocks 37 which are formed of a resilient material, such as rubber. Each of the mandrels is hollow and houses a vibrator mechanism 39.1, only one of which is shown in FIG. 5, operated by electric motors inside the mandrels.

In operation, the machine automatically moves forward in the direction of arrow 57 under the pressure of the spiral conveyors against the formed concrete in the molding chamber. Passage of the concrete through the molding chamber is eased by vibrations set up by the internal vibrators and by vibratory plates 46 and 47. Vibrations set up by the internal vibrators and vibratory plate 46 normally would cause settlement of the slab 10 over the finished cores 11 as the trailing mandrels leave the empty cores. However, these large amplitude vibrations are interfered with by the vibrations set up by the vibratory plate 47. These vibrations further compact the slab, but also serve to dampen the effect of the vibrations of the mandrel vibrators 39.1 and vibratory plate 46 so as to reduce substantially settling or sagging of concrete as the finishing plate 48 passes thereover.

Figure 1:
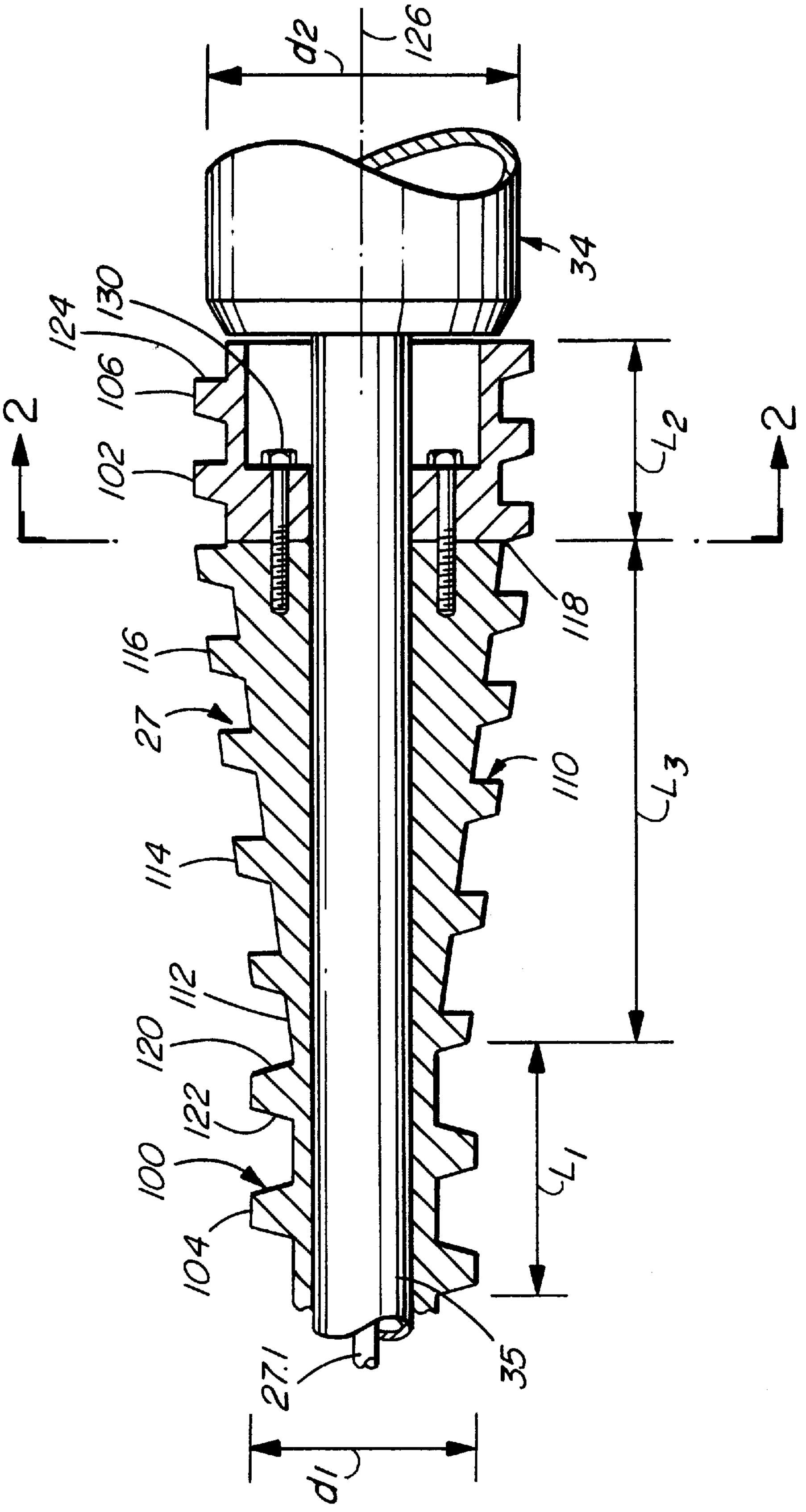
FIG. 1 is a longitudinal fragmentary section of a spiral conveyor for a concrete extrusion machine according to a first embodiment of the invention, shown adjacent to a fragment of a mandrel in elevation.

FIG. 1 shows spiral conveyor 27 in more detail. Conveyor 27 has a first spiral conveyor section 100 having a first length L1 and a first external diameter d1. There is a second spiral conveyor section 102 having a second external diameter d2 which, as seen, is greater than the first external diameter. The second section has a second length L2. The first section has a plurality of flights 104 which all have the constant external diameter d1. Likewise the second section has a plurality of flights 106 which have the constant external diameter d2.

There is a third spiral conveyor section 110 between the first section and the second section which has a third length L3. The third section has a first end 112 which is connected to the first section 100. In this particular embodiment, the first section and the second section are parts of a single casting. The first end of the third section has the same external diameter d1 as the first section. The third section is tapered and flights 114 thereof taper and gradually become larger in diameter towards the second section 102. Flights adjacent the second end 118 of the third section are equal in diameter to diameter d2.

Flights of the first section have leading edges 120 and trailing edges 122 which are both sloped in this example. However the flights in the second section of this embodiment have leading edges 124 which are essentially perpendicular to axis of rotation 126 of the spiral conveyor. The latter configuration helps in compaction of the concrete within the molding chamber. The second section 102 of the spiral conveyor is a separate component in the embodiment of FIG. 1 and is connected to the third section by bolts 130.

While the embodiment of FIG. 1 does allow the high wear section 102 to be replaced, it requires considerable disassembly of machine 20 so that bolts 130 can be removed and the section replaced. Also the bolts may become frozen due to the vibrations discussed above.

Figure 2:
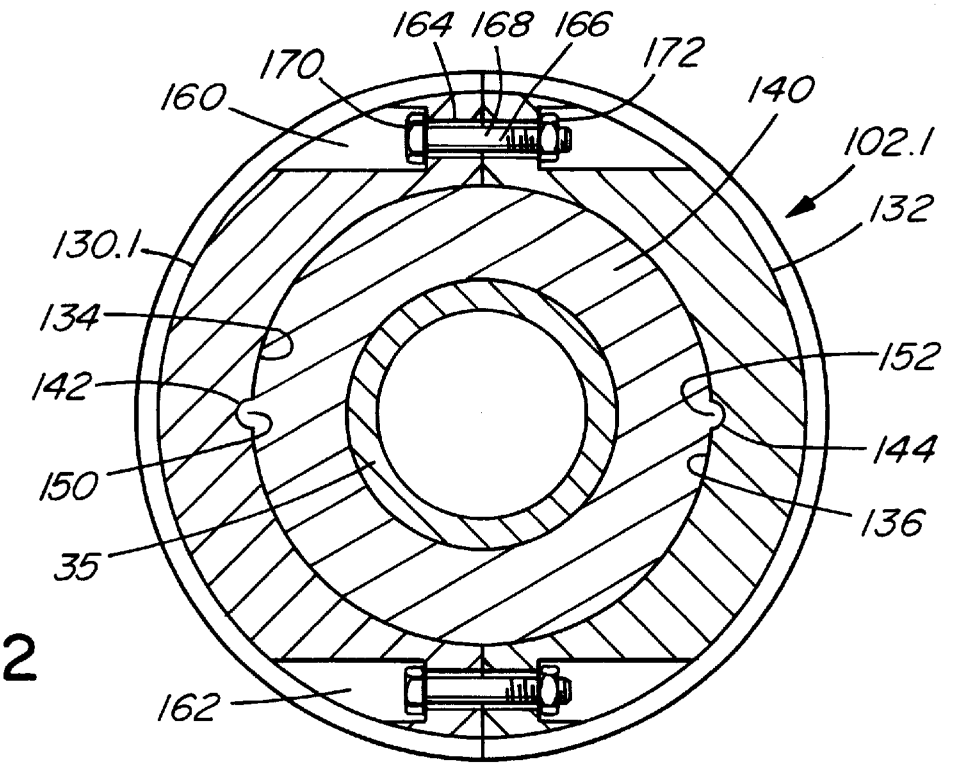
FIG. 2 is a sectional view taken along line 2—2 of FIG. 1, showing a variation of the invention where the replaceable section is in two halves.
Figure 3:
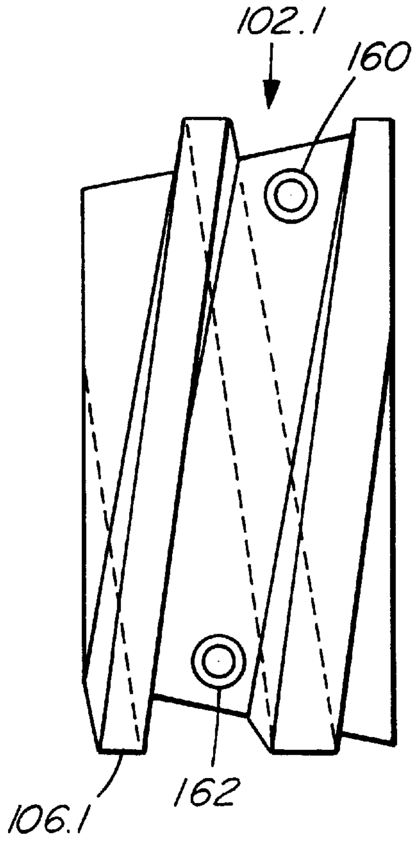
FIG. 3 is a fragmentary side elevation of the replaceable section.

Another embodiment, shown in FIGS. 2 and 3, permits easier replacement of section 102.1. Like numbers in this embodiment are used as in FIG. 1 with the additional designation "0.1". The second section 102.1 has two longitudinally divided components 130.1 and 132. In his particular example the two components are symmetrical halves, each half having a semi-cylindrical recess 134 or 136 therein. The recesses each receive half of hollow shaft 140 which extends from the main portion of the conveyor. The shaft may also be regarded as an extension of the main part of the conveyor apart from the second section.

There is a keyway 142 in half 130.1 of section 102.1. Half 132 has a similar keyway 144. The keyways extend longitudinally along the halves of the section and receive keys 150 and 152 of the hollow shaft respectively. In other examples only a single key and keyway may be used. However other locking devices could be substituted to prevent relative location between section 102.1 and the main portion of the conveyor.

Each section has a pair of apertures therein, such as apertures 160 and 162 of half 130.1. Each aperture has a narrower inner portion 164 as shown for aperture 160. The apertures 160 and 162 of the two halves are aligned to receive bolts 168. Shank 166 of each bolt extends through the narrower portions 168 of the apertures, while the wider portions of the apertures receive head 170 of each bolt and nut 172. Thus it may be seen that the two halves of section 102.1 are connected together by the bolts 168 which extend parallel to each other in this embodiment, but are spaced-apart from shaft 140. The bolts do not extend into the hollow shaft. Accordingly, if the bolts become frozen, they can be removed by simply burning off their heads 170 or the nuts 172. The keyway and keys prevent relative rotation between the section 102.1 and the main portion of the auger, but do not actually connect them together and, accordingly, do not inhibit removal of the section from the hollow shaft after the bolts are removed from the apertures 160 and 162.

Figure 7:
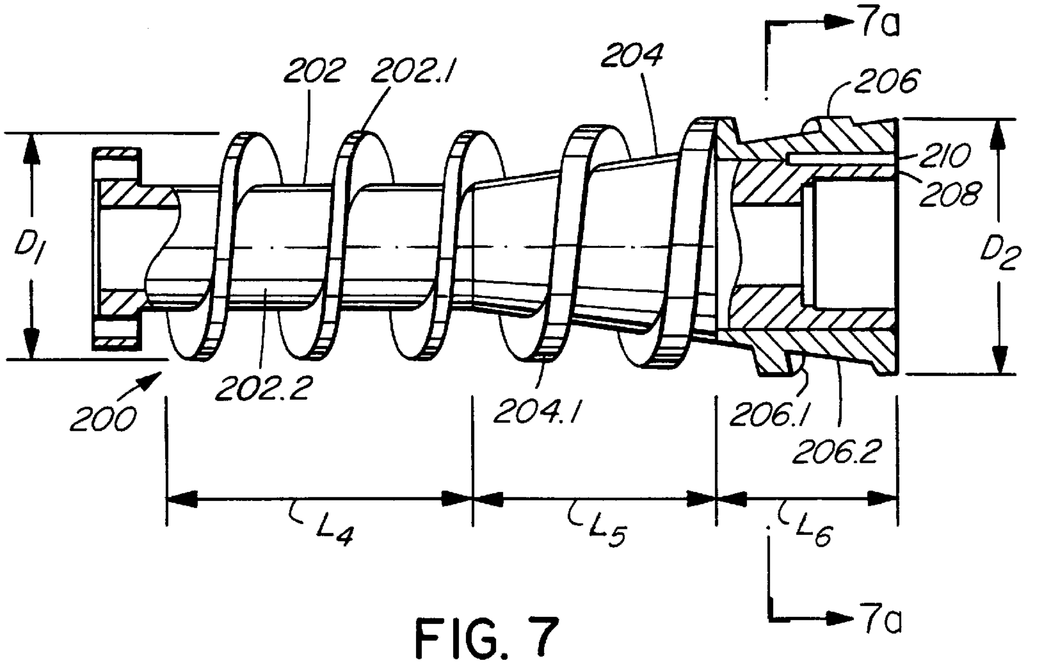
FIG. 7 is a side elevation, partly broken away, of a spiral conveyor according to a second embodiment of the invention.
Figure 7A:
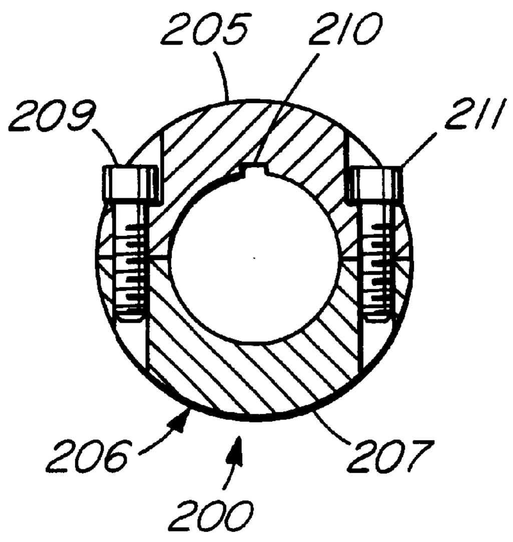
FIG. 7*a* is a sectional view along line 7*a*—7*a* of FIG. 7.

FIGS. 7 and 7*a* show a spiral conveyor similar to the spiral conveyor of FIG. 2. Conveyor 200 has a section 202 with flights 202.1 of a constant diameter $D_1$. The flights 204.1 of section 204 taper and increase in size towards section 206 which has flights 206.1 of a constant diameter $D_2$ greater than section 202. Sections 202, 204 and 206 have lengths L4, L5 and L6 respectively. A hollow shaft 208 extends from a one piece casting forming sections 204 and 208 in this example. Section 206 is keyed onto shaft 208 by a keyway 210. Bolts 209 and 211 connect together two halves 205 and 207 of section 206. As seen in FIG. 7, the flights 202.1 of section 202 extend radially outwards further from shaft section 202.2 than the flights 206.1 of section 206 extend from shaft section 206.2.

Figure 8:
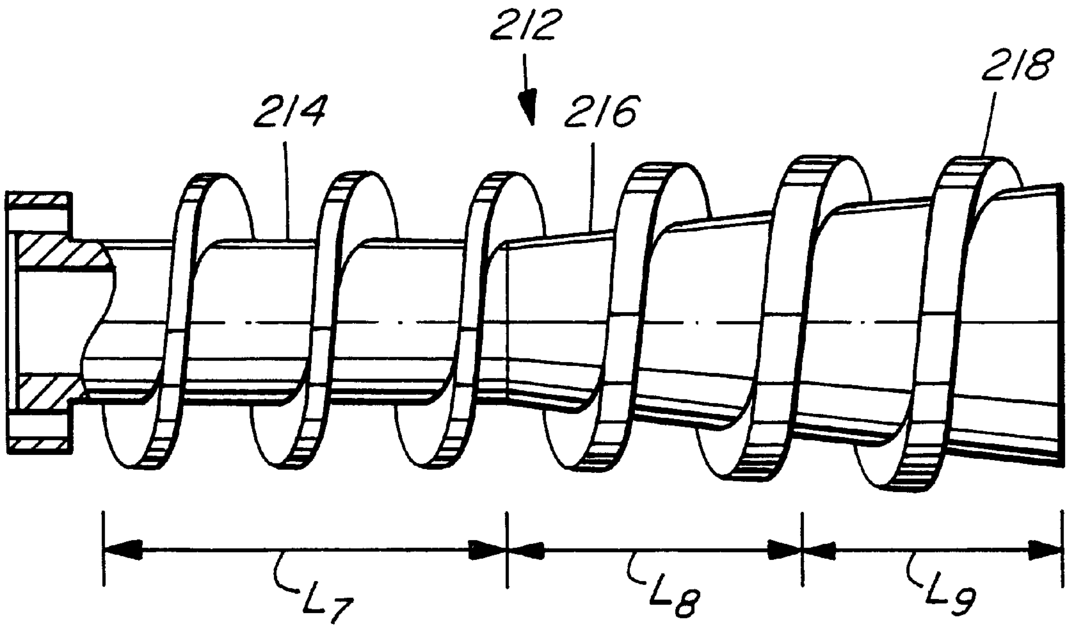
FIG. 8 is a view similar to FIG. 7 of a spiral conveyor according to a third embodiment of the invention.

FIG. 8 shows another conveyor 212 with three sections 214, 216 and 218 with lengths L7, L8 and L9. The shape is similar to FIG. 7 but the entire conveyor is a one piece casting.

It will be understood by someone skilled in the art that many of the details provided above are by way of example only and are not intended to limit the scope of the invention which is to be interpreted with reference to the following claims:

What is claimed is:

1. A spiral conveyor for a concrete extrusion machine, the conveyor comprising:

a first spiral conveyor section, the first section being straight having a first length, a first external diameter, and flights of the first diameter, which is constant along the first length;

a second spiral conveyor section having a second length, the first section being spaced apart from the second section, the second section having flights of a second diameter, which is constant along the second the length and which is greater than the first diameter, and having two longitudinally divided components, each said component having a longitudinal recess;

a tapered, third spiral conveyor section between the first section and the second section, having a third length, a first end adjacent to the first section and a second end adjacent to the second section, the first end of the third section having the first external diameter and the second end of a third section having the second external diameter;

means for mounting the spiral conveyor in the extrusion machine; and a hollow shaft adjacent to the second end of the third spiral conveyor section, the second spiral conveyor section being removably mounted on to the shaft, the shaft being received between the two components thereof.

2. A spiral conveyor as claimed in claim 1, including removable connectors which connect the two components together.

3. A spiral conveyor as claimed in claim 1, wherein the connectors are spaced apart radially outwards from the recesses.

4. A spiral conveyor as claimed in claim 3, wherein each component of the second spiral conveyor section has an aperture to each side of the recesses and spaced-apart therefrom, the apertures of the components being aligned, the connectors extending through the apertures of the two components.

5. A spiral conveyor as claimed in claim 4, wherein the connectors include bolts extending through the apertures.

6. A spiral conveyor as claimed in claim 5, wherein the bolts are spaced apart from the hollow shaft.

7. A spiral conveyor as claimed in claim 1, including a locking device between the second spiral conveyor section and the hollow shaft, whereby the second section is non-rotatable about the shaft.

8. A spiral conveyor as claimed in claim 1, wherein the locking device includes a key and a keyway.

9. A spiral conveyor for a concrete extrusion machine, the conveyor comprising:

a first spiral conveyor section;

an extension operatively connected to the first section; and a second spiral conveyor section mounted on the extension, the second section comprising two longitudinally divided components, each said component having a semi-cylindrical recess therein, at least one connector interconnecting the two components, said at least one connector engaging both components, and a locking device being between the extension and the second section.

10. A spiral conveyor as claimed in claim 9, wherein the locking device includes a key and a keyway.

11. A spiral conveyor as claimed in claim 10, wherein the two components are symmetrical halves of the second section, each having a pair of apertures to each side of the recesses, said at least one connector including two bolts extending between corresponding apertures of the two halves.

12. A spiral conveyor as claim in claim 11, wherein the bolts are spaced apart from the first section.

13. A spiral conveyor as claimed in claim 12, wherein the bolts are parallel.

14. A spiral conveyor for a concrete extrusion machine, the conveyor comprising:

a first spiral conveyor section having a first, straight shaft section, first flights of a first external diameter extending radially outwards from the first shaft section, a first length, the first diameter being constant along the first length;

a second spiral conveyor section having a second shaft section, second flights extending about the second shaft section having a second external diameter, which is greater than the first external diameter, and a second length, the second diameter being constant along the second length, the first conveyor section being spaced apart from the second conveyor section, the first flights extending radially outwards further from the first shaft section than the second flights extend radially outwards from the second shaft section, the second section having two longitudinally divided components, each said component having a longitudinal recess;

a tapered third spiral conveyor section between the first conveyor section and the second conveyor section, having a third length, a first end adjacent to the first conveyor section and a second end adjacent to the second conveyor section, the first end having the first external diameter and the second end having the second external diameter;

means for mounting the spiral conveyor in the extrusion machine; and a hollow shaft adjacent to the second end of the third spiral conveyor section, the second spiral conveyor section being removably mounted on the shaft, each said longitudinal recess of the second spiral conveyor section receiving part of the hollow shaft, whereby the shaft is received between the two components.

* * * * *